United States Patent
Kuroda et al.

(12) 
(10) Patent No.: US 6,331,930 B1
(45) Date of Patent: Dec. 18, 2001

(54) MULTILAYER CAPACITOR, ELECTRONIC DEVICE AND HIGH FREQUENCY CIRCUIT USING THE SAME

(75) Inventors: Yoichi Kuroda, Fukui; Yasuyuki Naito, Takefu; Haruo Hori, Sabae; Takanori Kondo, Sabae; Kyoshin Asakura, Sabae, all of (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/561,369

(22) Filed: Apr. 28, 2000

(30) Foreign Application Priority Data

May 10, 1999 (JP) .................................. 11-127909
Mar. 23, 2000 (JP) .................................. 12-081428

(51) Int. Cl.$^7$ ................................................ H01G 4/228
(52) U.S. Cl. ................................ 361/306.3; 361/308.1; 361/309; 361/303
(58) Field of Search ................................ 361/306.3, 307, 361/308.1, 309, 310–313, 321.2, 321.3, 303

(56) References Cited

U.S. PATENT DOCUMENTS

| | | |
|---|---|---|
| 3,308,359 | 3/1967 | Hayworth et al. . |
| 3,612,963 | 10/1971 | Piper et al. . |
| 3,822,397 | 7/1974 | Puppolo et al. . |
| 3,971,970 | 7/1976 | Voyles et al. . |
| 4,074,340 | 2/1978 | Leigh . |
| 4,274,124 | 6/1981 | Feinberg et al. . |
| 4,295,183 | 10/1981 | Miersch et al. . |
| 4,328,530 | 5/1982 | Bajorek et al. . |
| 4,346,429 | 8/1982 | DeMatos . |
| 4,419,714 | 12/1983 | Locke . |
| 4,424,552 | 1/1984 | Saint Marcoux . |
| 4,430,690 | 2/1984 | Chance et al. . |
| 4,706,162 | 11/1987 | Hernandez et al. . |
| 4,814,940 | 3/1989 | Horstmann et al. . |
| 4,830,723 | 5/1989 | Galvagni et al. . |
| 4,831,494 | 5/1989 | Arnold et al. . |
| 4,852,227 | 8/1989 | Burks . |
| 4,853,826 | 8/1989 | Hernandez . |
| 4,862,318 | 8/1989 | Galvangi et al. . |
| 5,517,385 | 5/1996 | Galvagni et al. . |
| 5,880,925 | 3/1999 | DuPre et al. . |

FOREIGN PATENT DOCUMENTS

| | | |
|---|---|---|
| 25 45 672 | 4/1977 | (DE) . |
| 0 191 668 | 8/1986 | (EP) . |
| 1464631 | 11/1965 | (FR) . |
| 2 707 123 | 6/1993 | (FR) . |
| 2-256216 | 10/1990 | (JP) . |
| 4-42910 | 2/1992 | (JP) . |
| 6-140283 | 5/1994 | (JP) . |
| 6-260364 | 9/1994 | (JP) . |
| 8-172026 | 7/1996 | (JP) . |

OTHER PUBLICATIONS

1991 Symposium on VLSI Technology, Digest of Technical Papers entitled "Multilayer Vertical Stacked Capacitors (MVDTC) for 64 Mbit and 256 Mbit DRAMS" by D. Temmler, Institute of Semiconductor Physics, Germany.
IBM Technical Disclosure Bulletin (vol.31, No. 3, Aug. 1988).
IBM Technical Disclosure Bulletin (vol. 32, No. 6B, Nov. 1989).

Primary Examiner—Anthony Dinkins
(74) Attorney, Agent, or Firm—Keating & Bennett, LLP (57) ABSTRACT

A multilayer capacitor is constructed and arranged to significantly reduce an equivalent serial inductance (ESL) and includes a capacitor body in which first and second inner electrodes extend, respectively, so as to connect first and second end surfaces and first and second side surfaces. First and second end surface terminal electrodes are provided on the first and second end surfaces. Also, first and second side surface terminal electrodes are provided on the first and second side surfaces, respectively. The widthwise dimension of the capacitor body is within a range of about 0.9 to about 1.1 times of the lengthwise dimension. Also, when a represents a lengthwise dimension and a widthwise dimension of the capacitor body, and b represents widths of the first inner electrodes and the second inner electrodes, it is preferable that a and b are determined so as to have the relationship of:

$$0.45 \leq b/a \leq 0.90.$$

28 Claims, 3 Drawing Sheets

MULTILAYER CAPACITOR, ELECTRONIC DEVICE AND HIGH FREQUENCY CIRCUIT USING THE SAME

BACKGROUND OF THE INVENTION

1. Field of the Invention

The present invention relates to a multilayer capacitor, and more particularly, the present invention relates to a multilayer capacitor that can be advantageously used in a high frequency circuit. The invention also relates to an electronic device that is configured using the aforementioned multilayer capacitor.

2. Description of the Related Art

A multilayer capacitor that relates to the present invention is disclosed in, for example, Japanese Unexamined Utility Model Publication No. 49-127736. The multilayer capacitor disclosed therein has a structure that allows residual inductance to be reduced so as to be suitable for the use with high frequencies.

More specifically, the conventional multilayer capacitor has a rectangular capacitor body which has an overall dimension defined by a lengthwise dimension and a widthwise dimension that is smaller than the lengthwise dimension, and a heightwise dimension. End surface terminal electrodes are individually disposed on two end surfaces of the capacitor body. The end surfaces oppose each other and are individually defined by the widthwise dimension and the heightwise dimension of the capacitor body.

Also, a first inner electrode and a second inner electrode are provided in the capacitor body via dielectric layers. The first inner electrode extends so as to connect the two end surfaces of the capacitor body, thereby being electrically connected to the aforementioned end surface terminal electrodes at end sections thereof. On the other hand, the second inner electrode extends so as to connect two side surfaces, thereby being electrically connected to the aforementioned side surface terminal electrodes at end sections thereof.

Thus, the multilayer capacitor disclosed in the aforementioned publication has four terminal electrodes on two end surfaces and two side surfaces. Therefore, the residual inductance can be reduced to be less than the residual inductance in the case of a typical conventional multilayer capacitor that has only two terminal electrodes. However, electronic circuits that use the aforementioned multilayer capacitor having four terminal electrodes are still required to be used in higher frequency bands. To meet this requirement, the residual inductance, that is, equivalent serial inductance (ESL), must be reduced even more.

SUMMARY OF THE INVENTION

In order to overcome the problems described above, preferred embodiments of the present invention provide a multilayer capacitor that is constructed and arranged so as to minimize the ESL.

In addition, preferred embodiments of the present invention provide an electronic device and a high frequency circuit that include the multilayer capacitor described in the preceding paragraph.

According to one preferred embodiment of the present invention, a multilayer capacitor includes a capacitor body that has a shape defined by a lengthwise dimension, a widthwise dimension, and a heightwise dimension, first and second main surfaces that oppose each other and are individually defined by the lengthwise dimension and the widthwise dimension, first and second side surfaces that oppose each other and are individually defined by the lengthwise dimension and the heightwise dimension, and first and second end surfaces that oppose each other and are individually defined by the widthwise dimension and the heightwise dimension.

The capacitor body includes a plurality of dielectric layers extending toward the main surfaces, and at least one pair of first and second inner electrodes that oppose each other via the dielectric layers so that a capacitor unit is formed.

The first inner electrode extends so as to connect the first and second end surfaces, and the second inner electrode extends so as to connect the first and second side surfaces.

Also, first and second end surface terminal electrodes electrically connected to individual ends of the first inner electrode are provided on the first and second end surfaces, respectively, and first and second side surface terminal electrodes electrically connected to individual ends of the second inner electrode are provided on the first and second side surfaces, respectively.

In the multilayer capacitor configured as above, it was discovered that the ESL is minimized if the lengthwise dimension and the widthwise dimension are substantially the same.

Although it was discovered that the ESL can be minimized when the lengthwise dimension and the widthwise dimension are substantially the same, during manufacture of multilayer capacitors, it is relatively difficult to stably obtain capacitor bodies that have the lengthwise dimension and the widthwise dimension that are identical to each other without dimensional variations being produced.

Therefore, according to the present invention, an appropriate range of ratios of the lengthwise dimension and the widthwise dimension is provided. As a result, the ESL can be reliably minimized even when the lengthwise dimension and the widthwise dimension are not exactly the same. According to preferred embodiments of the present invention, the widthwise dimension of the capacitor body is preferably within a range of about 0.9 to about 1.1 times of the lengthwise dimension.

According to the unique structure and arrangement of preferred embodiments of the present invention, magnetic fluxes induced by current that flows in the multilayer capacitor effectively cancel each other, thereby minimizing the ESL. This allows resonant frequencies in the multilayer capacitor to be greatly increased. Therefore, a frequency range that functions in the multilayer capacitor is increased. Consequently, the multilayer capacitor is very well suited for use in high-frequency electronic circuits.

Also, according to preferred embodiments of the present invention, as a preferable ratio of the lengthwise dimension and the widthwise dimension, not only one specific value, but the range of values, that is, about 0.9 to about 1.1, is preferred. Therefore, during manufacture of the capacitor body of the multilayer capacitor, problems with dimensional variations are eliminated.

Also, in preferred embodiments of the present invention, it is preferable that individual widths of the first and second inner electrodes are substantially uniform. In this case, the lengthwise dimension and the widthwise dimension are arranged either to be the same or substantially to be the same. In addition, the terminal electrodes are individually provided on two end surfaces and two side surfaces, each of the individual terminal electrodes is connected to at least one of ends of the inner electrodes. Therefore, directional characteristics with respect to the length direction and the width direction can be substantially disregarded. This allows the multilayer capacitor to be easily handled and mounted since the component does not have any directionality can be picked up, moved and mounted without regard for positional orientation.

Also, when the individual widths of the first and second inner electrodes are substantially the same, the dimensions of four portions where the inner electrodes do not overlap with each other can be arranged substantially to be the same. Therefore, magnetic fluxes induced by current that flows in the portions where the inner electrodes do not overlap with each other can be set off, thereby allowing further reduction in the ESL to be implemented.

Also, as described above, when the individual widths of the inner electrodes are substantially the same, that is, when the inner electrodes do not form angles in peripheral edge portions, electric-field concentration does not occur easily. Therefore, the dielectric strength of the multilayer capacitor is greatly improved.

Also, it is preferable that the lengthwise dimension and the widthwise dimension of the capacitor body are determined to be within a range of about 1.5 to about 4.0 mm. In this case, it is more preferable that widths of the first and second inner electrodes are determined to be within a range of about 0.9 to about 2.5 mm. In this case, the desirable reduction effects for the ESL are achieved.

Also, in the above, when a represents the lengthwise dimension and the widthwise dimension and b represents widths of the first inner electrodes and the second inner electrodes, it is preferable that a and b defined above have the relationship:

$$0.45 \leq b/a \leq 0.90.$$

In this case, it is more preferable that a and b have the relationship of:

$$0.50 \leq b/a \leq 0.85.$$

According to the above, the ESL is reliably reduced. In addition, reduction in frequency characteristics which can be caused when a second resonance caused by floating capacitances approaches an essential first resonance can be surely prevented.

Also, in preferred embodiments of the present invention, it is preferable that the relative dielectric constant of a dielectric material which defines the dielectric layers is smaller than about 50. As a result, a phenomenon in which a second resonant frequency approaches a first resonant frequency does not occur easily. Therefore, the multilayer capacitor is very well suited for use with high frequencies.

Also, in the above, to obtain an increased capacitance, it is preferable that the multilayer capacitor includes multiple pairs of the first and second inner electrodes. This allows the multilayer capacitor to achieve even larger electrostatic capacitance.

Also, in the above, the first and second inner electrodes may be positioned closer to one of the first and second main surfaces of the capacitor body.

Also, it is preferable that a first resonant frequency is at least 1 GHz, and a second resonant frequency is at least 1.5 times of the first resonant frequency. In this case, the second resonance influences the first resonance, thereby allowing reduction in frequency characteristics to be prevented. Therefore, the multilayer capacitor is very well suited for use with high frequencies.

Also, according to another preferred embodiments of the present invention, an electronic device includes the multilayer capacitor described above a wiring substrate positioned so as to oppose the first and second main surfaces and so as to allow the multilayer capacitor to be easily mounted. In this case, it is preferable that the wiring substrate is positioned so that one of the first and second main surfaces of the capacitor body is opposed to the wiring substrate, so that the first and second inner electrodes are provided closer.

According to the above configurations, the distance of current that flows through the terminal electrodes is greatly reduced, thereby allowing the ESL to be minimized.

Furthermore, according to another preferred embodiments of the present invention, there is provided a high frequency circuit including the multilayer capacitor according to the preferred embodiment described above.

Thus, in high frequency circuits, the multilayer capacitor according to preferred embodiments of the present invention can be advantageously used as one of a decoupling capacitor, an impedance-matching capacitor, a dielectric-current cutting capacitor, and a low-pass/high-pass filtering capacitor.

Other features, elements, characteristics and advantages of the present invention will be described below with reference to the attached drawings.

DETAILED DESCRIPTION OF PREFERRED EMBODIMENTS

Figure 1:
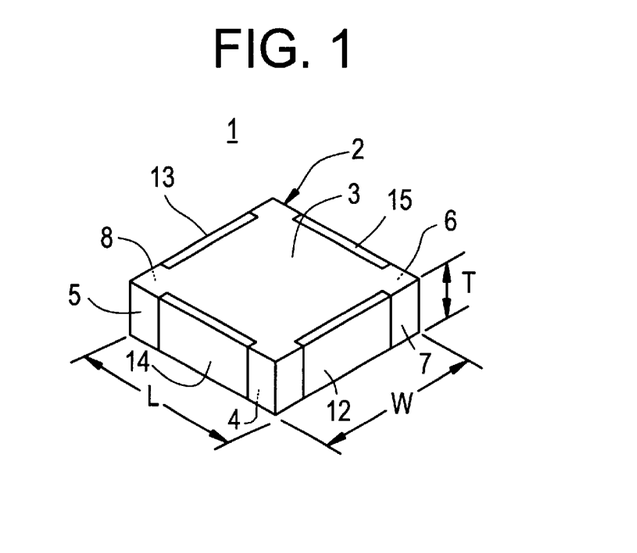
FIG. 1 is a perspective view showing an appearance of a preferred embodiment of a multilayer capacitor according to the present invention.
Figure 2A:
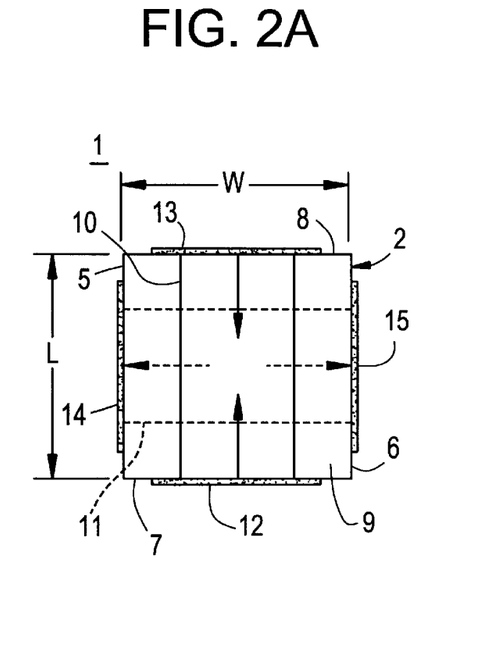
FIG. 2A is a plan view showing an interior structure of the multilayer capacitor in FIG. 1 in a cross-section where one of two inner electrodes extends.
Figure 2B:
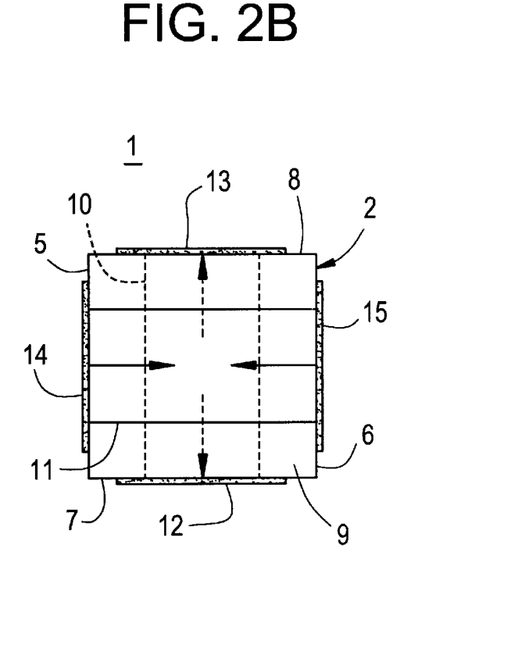
FIG. 2B is a plan view showing the interior structure of the multilayer capacitor in FIG. 1 in a cross-section where the other one of the two inner electrodes extends.

FIG. 1 is a perspective view showing an appearance of a multilayer capacitor 1 according to a preferred embodiment of the present invention. FIG. 2A is a plan view of an interior structure in a cross-section of the multilayer capacitor 1, and FIG. 2B is a plan view of an interior structure in a different cross-section thereof.

The multilayer capacitor 1 has a capacitor body 2. The outer dimension of the capacitor body 2 is determined by a lengthwise dimension L, a widthwise dimension W, and a thickness T. The capacitor body 2 has a first main surface 3 and a second main surface 4, a first side surface 5 and a second side surface 6, and a first end surface 7 and a second end surface 8. The first and second main surfaces 3 and 4 that oppose each other and are determined by the lengthwise dimension L and the widthwise dimension W. The first and second side surfaces 5 and 6 that oppose each other and are determined by the lengthwise dimension L and the thickness T. The first and second end surfaces 7 and 8 that oppose each other and are determined by the lengthwise dimension and the heightwise dimension.

The capacitor body 2 also has a plurality of dielectric layers 9, and a first inner electrode 10. The dielectric layers 9 extend in the direction of the first and second main surfaces 3 and 4. The first and second inner electrodes 10 and 11 are arranged so as to oppose each other via specific dielectric layers 9, thereby forming a capacitor body. In this preferred embodiment, only a single pair of the first and second inner electrodes 10 and 11 is provided. As is apparent in other preferred embodiments described below, a plurality of pairs thereof may be provided.

FIG. 2A shows a cross-section where the first inner electrode 10 extends. FIG. 2B shows a cross-section where the second inner electrode 11 extends. As shown in FIG. 2A, the first inner electrode 10 extends so as to connect the area between the first and second end surfaces 7 and 8 of the capacitor body 2. Also, as shown in FIG. 2B, the second inner electrode 11 extends so as to connect the area between the first and second side surfaces 5 and 6 of the capacitor body 2.

In this preferred embodiment, the widthwise dimensions of the first and second inner electrodes 10 and 11 are preferably substantially the same. A first end surface terminal 12 and a second end surface terminal 13 are, respectively, provided on the first end surface 7 and the second end surface 8 of the capacitor body 2. Similarly, a first side surface terminal 14 and a second side surface terminal 15 are, respectively, provided on the first side surface 5 and the second side surface 6. The first and second end surface terminals 12 and 13 are electrically connected to individual ends of the first inner electrode 10. Similarly, the first side surface terminals 14 and 15 are electrically connected to individual ends of the second inner electrode 11.

In the multilayer capacitor 1 as described above, the widthwise dimension W of the capacitor body 2 is preferably within a range of about 0.9 to about 1.1 times of the lengthwise dimension L. Such preferable ratios of the lengthwise dimension L and the widthwise dimension W were obtained as described in the following paragraphs.

As shown in Table 1, with the lengthwise dimension L (L dimension) being fixed at about 2.0 mm, the widthwise dimension W was varied; thereby, multilayer capacitors for samples 1 to 7 whose L-W ratios are varied are manufactured. According to this, equivalent serial inductances (ESLs) were obtained.

TABLE 1

| Sample No. | L-W Ratio | L (mm) | W (mm) | ESL (pH) |
| --- | --- | --- | --- | --- |
| 1 | 1:0.6 | 2.0 | 1.2 | 117 |
| 2 | 1:0.8 | 2.0 | 1.6 | 113 |
| 3 | 1:0.9 | 2.0 | 1.8 | 106 |
| 4 | 1:1 | 2.0 | 2.0 | 106 |
| 5 | 1:1.1 | 2.0 | 2.2 | 107 |
| 6 | 1:1.2 | 2.0 | 2.4 | 140 |
| 7 | 1:1.4 | 2.0 | 2.8 | 179 |

In the experiment, the width of the interior electrode was fixed at 1.0 mm. Also, a pair of first and second interior electrodes was formed, and the thickness of dielectric layers therebetween was arranged to be 100 μm. For composing the dielectric layers, a dielectric material having a relative dielectric constant of 25 was used.

With reference to Table 1, as in the case of the sample 4, the ESL is minimized in the L-W ratio of approximately 1 to 1. Also, as in the cases of the sample 3, 4, and 5, the ESLs are stabilized at relatively low values when the L-W ratio is within a range of about 1:0.9 to about 1:1.1. This indicates that the widthwise dimension W of the capacitor body 2 is preferably within the range of about 0.9 to about 1.1 times of the lengthwise dimension L. The reasons why the ESL can thus be reduced by determining the widthwise dimension W within the above-mentioned range are described below.

With reference to FIGS. 2A and 2B, there are portions where the first and second inner electrodes 10 and 11 overlap with each other and portions where they do not overlap with each other. In a portion where the first and second inner electrodes 10 and 11 overlap with each other, currents flows in different directions (indicated by the solid-line arrow and the dotted-line arrow). This causes magnetic fluxes induced by these currents which offset each other, thereby causing the ESL to be minimized. On the other hand, in a portion where the first and second inner electrodes 10 and 11 do not overlap with each other, current flows only in a single direction. Therefore, as compared to the aforementioned portion where the first and second inner electrodes 10 and 11 overlap with each other, the ESL is increased.

However, when the lengthwise dimension L and the widthwise dimension W of the capacitor body 2 are substantially the same, the four portions where the first and second inner electrodes 10 and 11 do not overlap with each other have dimensions that are substantially the same. Therefore, for these four portions, pass lengths of currents that flow in relation thereto are the same. When the magnetic fluxes induced by the currents that flow in relation to the regions where the first and second inner electrodes 10 and 11 do not overlap with each other are entirely visible, they work so as to cancel each other out which prevents any increase in the ESL.

When the relative difference between the lengthwise dimension L and the widthwise dimension W of the capacitor body 2 is significantly large, dimensions of the four regions the first and second inner electrodes 10 and 11 do not overlap with each other are different from each other. This causes non-uniformity in the pass length of currents that flow in relation to the four regions where first and second inner electrodes 10 and 11 do not overlap with each other. This is the reason that sufficient set-off effects in magnetic fluxes cannot be obtained, and the ESL is increased.

As described above, to prevent the increase in the ESL by arranging the dimensions of the four zones where the first and second inner electrode 10 and 11 do not overlap with each other, as shown in FIGS. 2A and 2B, the individual widthwise dimensions are preferably the same and are the same.

The next experiment was carried as follows. As in the multilayer capacitor 1 shown in FIGS. 2A and 2B, the lengthwise dimension L and the widthwise dimension W of the capacitor body 2 are preferably the same. In this condition, the L and W dimensions are varied in a range from about 1.0 mm to about 5.0 mm, and the individual widths of the first and second inner electrodes are varied in a range from about 0.4 mm to about 2.5 mm according to the varied L and W dimensions. As a result, various multilayer capacitors were obtained. Then, the experiment was carried out to obtain ESLs for these multilayer capacitors with the results shown in Table 2 below. Other conditions in this experiment are the same as those for the preceding experiment.

TABLE 2

| Sample No. | L and W Dimensions (mm) | Inner Electrode Width (mm) | ESL (pH) |
|---|---|---|---|
| 11 | 1.0 | 0.4 | 269 |
| 12 | 1.5 | 0.9 | 87 |
| 13 | 2.0 | 1.4 | 54 |
| 14 | 3.0 | 2.0 | 63 |
| 15 | 4.0 | 2.5 | 82 |
| 16 | 4.5 | 2.5 | 110 |
| 17 | 5.0 | 2.5 | 149 |

With reference to Table 2, as in the cases of the samples 12 to 15, the ESLs are reduced when the L AND W dimensions are ranged from about 1.5 to about 4.0 mm.

In this connection, generally, when the L and W dimension are increased, the width of an inner electrode can be increased, and thereby, the level of current concentration in the portion where the inner electrode and a terminal electrode are connected can be reduced. For this reason, increasing the L and W dimensions allows the ESL to be reduced.

As in the cases of the samples 16 and 17, however, with the L and W dimensions that are increased larger than about 4.0 mm, the ESL increases greatly. This is because the dimension of the portion where the inner electrodes do not overlap with each other is increased. Also, the extreme increase in the L and W dimensions produces another problem in that floating capacitance cannot be disregarded.

On the other hand, as in the case of the sample 11, with the L and W dimensions that are smaller than about 1.5 mm, if a margin of about 0.3 mm at each side of a region where the inner electrode is formed is provided, the width of the inner electrode decreases to as small as about 0.4 mm, thereby increasing the ESL to an extremely high level. In this way, according to the experiment results shown in Table 2, preferable L and W dimensions are within a range of about 1.5 to about 4.0 mm. Also, dimensions of the individual widthwise dimensions are preferably within a range of about 0.9 to about 2.5 mm.

Figure 3:
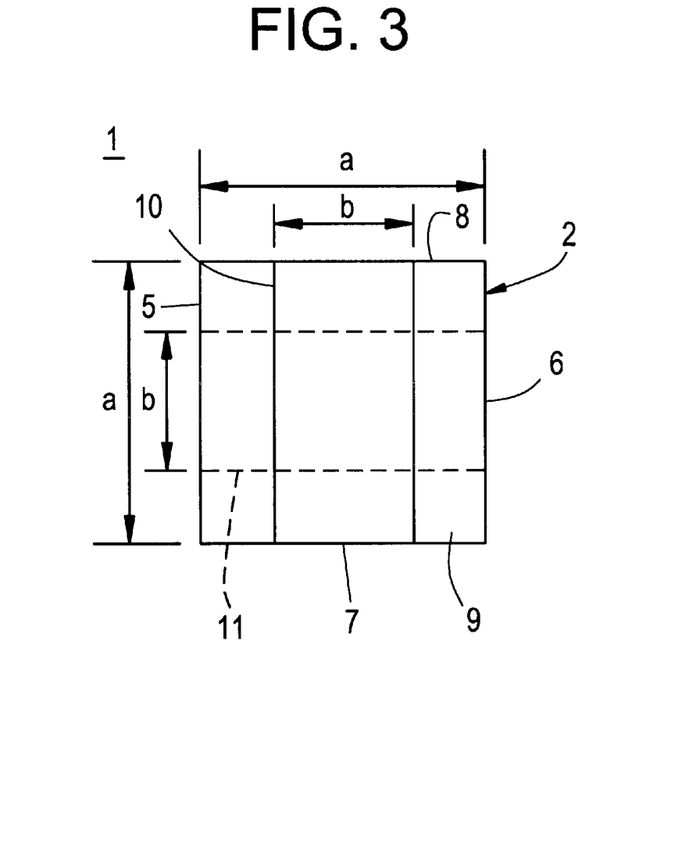
FIG. 3 is a plan view of a capacitor body of the multilayer capacitor in FIG. 1 and is used to explain the relationship between a lengthwise dimension and a widthwise dimension of the capacitor body, and widths of portions where the inner electrodes are connected to terminal electrodes.

In FIG. 3, the letter a represents the lengthwise dimension L and the widthwise dimension W of the capacitor body 2. The letter b represents the width of the portion where the first inner electrode 10 is connected to the first and second end surface terminals 12 and 13 (refer to FIGS. 2A and 2B). Also, b represents the width of the first inner electrode 10 and the width of the second inner electrode 11 (refer to FIGS. 2A and 2B). In this case, a preferable range exists for a ratio of a and b, that is, b/a. More specifically, b/a is preferably within a range of approximately $0.45 \leq b/a \leq 0.90$, and more preferably, it is within a range of approximately $0.50 \leq b/a \leq 0.85$. These preferable ranges of the b/a ratio were obtained from the data described below.

Table 3 shows ESLs of various types of multilayer capacitors obtained by varying the b/a ratio within a range of about 0.3 to about 0.9 in each case where the width a is set to about 1.0 mm, about 2.0 mm, about 3.0 mm, and about 4.0 mm.

TABLE 3

| | b/a = 0.9 | b/a = 0.85 | b/a = 0.8 | b/a = 0.6 | b/a = 0.5 | b/a = 0.45 | b/a = 0.35 | b/a = 0.3 |
|---|---|---|---|---|---|---|---|---|
| a = 1.0 mm | 48 pH | 54 pH | 62 pH | 110 pH | 160 pH | 200 pH | 300 pH | 380 pH |
| a = 2.0 mm | 20 pH | 24 pH | 31 pH | 80 pH | 120 pH | 150 pH | 250 pH | 310 pH |
| a = 3.0 mm | 16 pH | 21 pH | 27 pH | 70 pH | 110 pH | 130 pH | 220 pH | 280 pH |
| a = 4.0 mm | 17 pH | 23 pH | 29 pH | 70 pH | 110 pH | 130 pH | 220 pH | 280 pH |

Table 4 shows a first resonant frequency, a second resonant frequency, and a ratio of the second resonant frequency to the first resonant frequency of each of multilayer capacitors of which ESLs are shown in Table 1.

TABLE 4

| | | b/a = 0.95 | b/a = 0.9 | b/a = 0.85 | b/a = 0.8 | b/a = 0.6 | b/a = 0.5 | b/a = 0.45 | b/a = 0.35 | b/a = 0.3 |
|---|---|---|---|---|---|---|---|---|---|---|
| a = 1.0 mm | 1st[*1] | 12 GHz | 12 GHz | 12 GHz | 12 GHz | 12 GHz | 12 GHz | 12 GHz | 13 GHz | 13 GHz |
| | 2nd[*2] | 23 GHz | 24 GHz | 26 GHz | 28 GHz | 37 GHz | 40 GHz | 41 GHz | 44 GHz | 45 GHz |
| | 2nd/1st | 1.91 | 2.00 | 2.17 | 2.33 | 3.08 | 3.33 | 3.41 | 3.38 | 3.46 |
| a = 2.0 mm | 1st[*1] | 9.6 GHz | 9.4 GHz | 9.2 GHz | 8.5 GHz | 7.1 GHz | 6.9 GHz | 6.8 GHz | 6.8 GHz | 7.2 GHz |
| | 2nd[*2] | 10 GHz | 12 GHz | 14 GHz | 15 GHz | 21 GHz | 25 GHz | 27 GHz | 32 GHz | 34 GHz |
| | 2nd/1st | 1.04 | 1.28 | 1.52 | 1.76 | 2.96 | 3.62 | 3.97 | 4.71 | 4.72 |
| a = 3.0 mm | 1st[*1] | 7.4 GHz | 7.0 GHz | 6.5 GHz | 6.0 GHz | 5.1 GHz | 4.9 GHz | 4.9 GHz | 4.9 GHz | 5.1 GHz |
| | 2nd[*2] | 7.6 GHz | 8.6 GHz | 9.8 GHz | 10 GHz | 15 GHz | 18 GHz | 19 GHz | 24 GHz | 27 GHz |
| | 2nd/1st | 1.03 | 1.23 | 1.51 | 1.67 | 2.94 | 3.67 | 3.88 | 4.90 | 5.29 |

TABLE 4-continued

|  |  | b/a = 0.95 | b/a = 0.9 | b/a = 0.85 | b/a = 0.8 | b/a = 0.6 | b/a = 0.5 | b/a = 0.45 | b/a = 0.35 | b/a = 0.3 |
|---|---|---|---|---|---|---|---|---|---|---|
| a = 4.0 mm | 1st[*1] | 5.5 GHz | 5.1 GHz | 4.6 GHz | 4.4 GHz | 3.8 GHz | 3.6 GHz | 3.6 GHz | 3.7 GHz | 3.8 GHz |
|  | 2nd[*2] | 5.9 GHz | 6.5 GHz | 7.4 GHz | 8.1 GHz | 11 GHz | 13 GHz | 15 GHz | 19 GHz | 21 GHz |
|  | 2nd/1st | 1.07 | 1.27 | 1.61 | 1.84 | 2.89 | 3.61 | 4.17 | 5.14 | 5.53 |

Notes:
[*1]: "1st" represents the first resonant frequency.
[*2]: "2nd" represents the second resonant frequency.

Table 3 shows a tendency that the smaller b/a ratios decrease, the higher the ESLs increase. More particularly, when the b/a ratio is less than about 0.45, the ESL sharply increases.

As described above, corresponding to the reduction in the b/a ratio, the area where the first and second inner electrodes 10 and 11 do not overlap with each other is increased in each of the first and second inner electrodes 10 and 11. Thereby, the level of current concentration in the individual portions to which first and second end surface terminals 12 and 13 and the first side surface terminals 14 and 15 are extended. As described above, the increase in the level of the current concentration is considered to cause the ESL to increase corresponding to reduction in the b/a ratio. From these factors, preferable b/a ratios are determined to be at least about 0.45, and more preferable b/a ratios are determined to be at least about 0.50 to reduce the ESL even more reliably.

Table 4 shows a phenomenon in which the first resonant frequency and the second resonant frequency become even closer to each other corresponding to the increase in the b/a ratio. The first resonance is caused by an essential capacitance and the ESL. The second resonance is caused by two floating capacitances. One of the capacitances is generated between the first inner electrode 10 and the first side surface terminals 14 and 15 that are not connected thereto. The other one of the capacitances is generated between the second inner electrode 11 and the first and second end surface terminals 12 and 13 that are not connected thereto.

Particularly, when the b/a ratio exceeds about 0.9, for example, when the b/a ratio is about 0.95, and a is individually about 2.0 mm, about 3.0 mm, and about 4.0 mm, the first resonance and the second resonance substantially overlap with each other. This is attributed to the fact that b increased when a is relatively large causes the aforementioned floating capacitances, thereby, the first resonant frequency shifts to a low frequency side.

Thus, when a point of the second resonance approaches a point of the first resonance, frequency characteristics of the multilayer capacitor 1 are reduced, thereby, the second resonant frequency shifts to the low frequency side. Accordingly, the frequency range usable as a capacitor is lowered so as to be unsuitable for the use with high frequencies.

From the above, it can be determined that the second resonant frequency that is at least about 1.5 times of the first resonant frequency is preferable for high frequency circuits of which the use-frequency range is 1 GHz or larger, particularly, for high frequency circuits of which the use-frequency range is about 5 GHz or larger. To satisfy this requirement, preferable b/a ratios are at most about 0.9, and to satisfy the requirement more reliably, it is preferable that the ratios are at most about 0.85.

From the above, to obtain the ESL that is minimized and is suitable for the use with high frequencies, as described above, the preferable b/a is within a range of $0.45 \leq b/a \leq 0.90$; more preferably, it is within a range of $0.50 \leq b/a \leq 0.85$. The multilayer capacitor 1 thus arranged is advantageously destined for use with at least 1-GHz high frequencies. More particularly, it is preferably destined use with at least 5-GHz high frequencies.

If the most typical conventional two-terminal capacitor is used in the frequency bands as described above, since it has a high ESL and resonance points positioned on the side of low frequency, it is not capable of functioning as a capacitor. Among conventional capacitors that may be capable of functioning in the aforementioned frequency bands, however, only those that have a very small capacitance would be capable of functioning therein. Under these circumstances, capacitors that have a large capacitance and a low ESL are required. The multilayer capacitor 1 of the present preferred embodiment satisfies the requirement.

In high frequency circuits, the multilayer capacitor 1 is advantageously used as a decoupling capacitor, an impedance-matching capacitor, a DC cutting capacitor, or a low-pass/high-pass filtering capacitor.

Also, a high frequency circuit of which the use-frequency range is at least 1 GHz is used either by a portable telephone or a base station of the portable telephone. A high frequency circuit of which the use-frequency range is at least 5 GHz is used, for example, in a radio LAN (5 to 30 GHz), satellite communication (10 to 20 GHz), and ETC (ranging from 5 GHz). As a practical example, FIG. 4 shows a diagram of a receiving-side amplifier circuit of a satellite-communication portable telephone.

Figure 4:
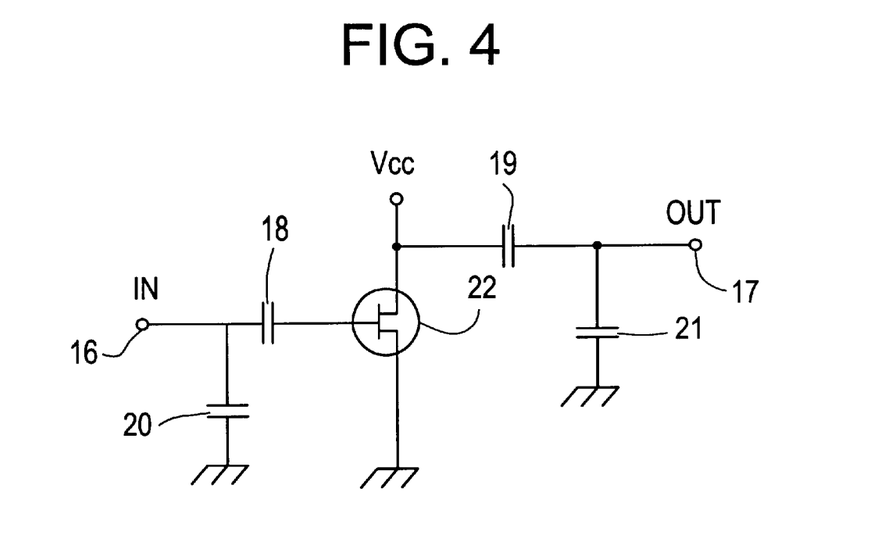
FIG. 4 shows a diagram of a receiving-side amplifier circuit of a satellite-communication portable telephone as an example in which the multilayer capacitor in FIG. 1 is advantageously used.

In FIG. 4, DC-cutting capacitors 18 and 19 are connected to cut DC components in signals that pass from an input terminal 16 to an output terminal 17. Relating to this signal line, impedance-matching capacitors 20 and 21 are connected to match impedances. Also, a DC voltage Vcc is applied between the source and the drain of a transistor 22.

In the above-described high frequency circuit, the multilayer capacitor 1 of this preferred embodiment can be advantageously used for any one of the DC-cutting capacitors 18 and 19 and the impedance-matching capacitors 20 and 21. For the DC-cutting capacitors 18 and 19, superior frequency characteristics are required. Therefore, preferably, the capacitors have characteristics in which the second resonant frequency is about 1.5 times of the first resonant frequency.

Also, for the multilayer capacitor 1, the relative dielectric constant of dielectric materials that define the dielectric layers 9 is preferably about 50 or smaller. This preferable condition is obtained according to experiments described below.

Figure 5:
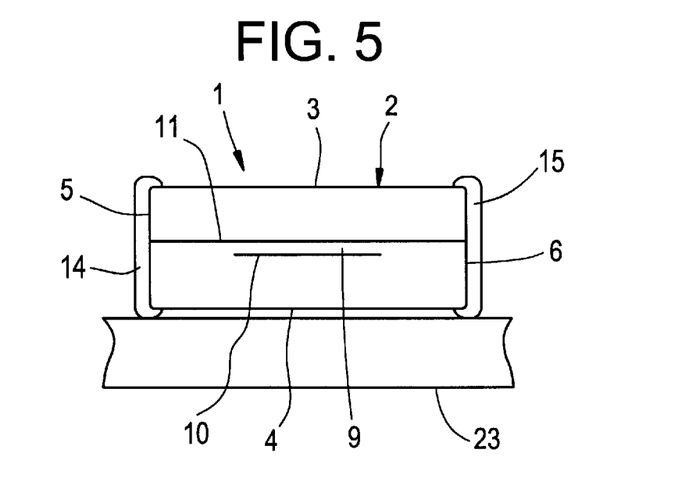
FIG. 5 is an elevated view of a structure wherein the multilayer capacitor in FIG. 1 is mounted on a wiring substrate.

For the multilayer capacitor 1, a and b thereof, which are shown in FIG. 3, are arranged to be about 2.0 mm and about 1.7 mm, respectively. The multilayer capacitor 1 is designed so as to produce the same capacitance. Then, as shown in FIG. 5, a relative dielectric constant ε is varied within a range of about 10 to about 100. With these conditions, the first resonant frequency, the second resonant frequency, and the ratio of the second resonant frequency to the first resonant frequency are obtained for each variation in the relative dielectric constant ε.

TABLE 5

|  | $\varepsilon = 10$ | $\varepsilon = 25$ | $\varepsilon = 35$ | $\varepsilon = 50$ | $\varepsilon = 100$ |
| --- | --- | --- | --- | --- | --- |
| 1st[*1] | 6.4 GHz | 6.3 GHz | 6.3 GHz | 6.1 GHz | 6.1 GHz |
| 2nd[*2] | 23 GHz | 14 GHz | 12 GHz | 10 GHz | 6.6 GHz |
| 1st/2nd | 3.59 | 2.22 | 1.90 | 1.64 | 1.08 |

Notes:
[*1]: "1st" represents the first resonant frequency.
[*2]: "2nd" represents the second resonant frequency.

As can be seen, Table 5 shows a phenomenon in which the first resonant frequency approaches closer to the second resonant frequency corresponding to the increase in the relative dielectric constant ε. When ε exceeds 50, for example, when it is 100, the ratio of the second resonant frequency to the first resonant frequency is about 1.08. This value is below about 1.5 that is the lower limit of the preferable condition required in the case where the multilayer capacitor 1 is to be used in the aforementioned high frequencies. Thus, a preferable relative dielectric constant ε is about 50 or smaller so as to use the multilayer capacitor 1 with high frequencies.

FIG. 5 shows a portion of an electronic device. The electronic device has a multilayer capacitor 1 and a wiring substrate 23. For example, the wiring substrate 23 is arranged to oppose the second main surface 4 of a capacitor body 2 of the multilayer capacitor 1.

Figure 6:
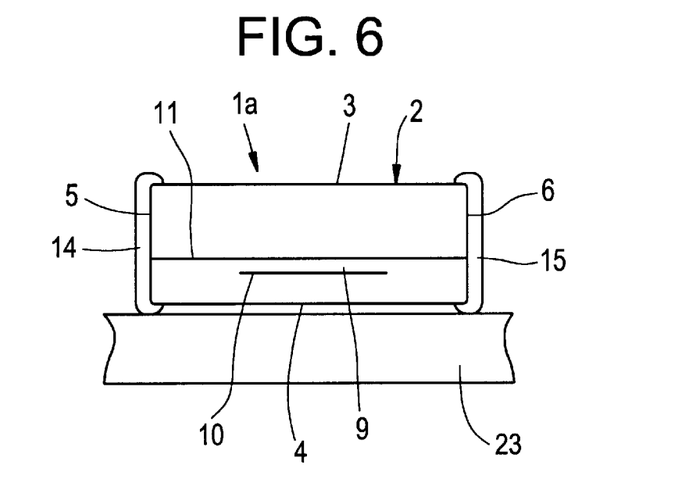
FIG. 6 is an elevated view of a structure wherein a multilayer capacitor of another preferred embodiment of the present invention is mounted on a wiring substrate.

For example, as shown in FIG. 5, for the multilayer capacitor 1 to be mounted on the wiring substrate 23, preferably, a multilayer capacitor 1a as shown in FIG. 6 is used. The multilayer capacitor 1a has a first and second inner electrodes 10 and 11 that are provided, for example, at a location that is closer to a second main surface 4 of the capacitor body 2. The multilayer capacitor 1a is preferably mounted on the wiring substrate 23 in a state where the wiring substrate 23 is positioned so as to oppose the second main surface 4 provided in the position to which the first and second inner electrodes 10 and 11 are located closer.

According to the mounted structure shown in FIG. 6, the first and second inner electrodes 10 and 11 can be located closer to the wiring substrate 23. Therefore, the length of current that flows through terminal electrodes 12 to 15 is reduced to be less than in the case of the multilayer capacitor 1 shown in FIG. 5. This allows the ESL to be reduced even more.

Figure 7:
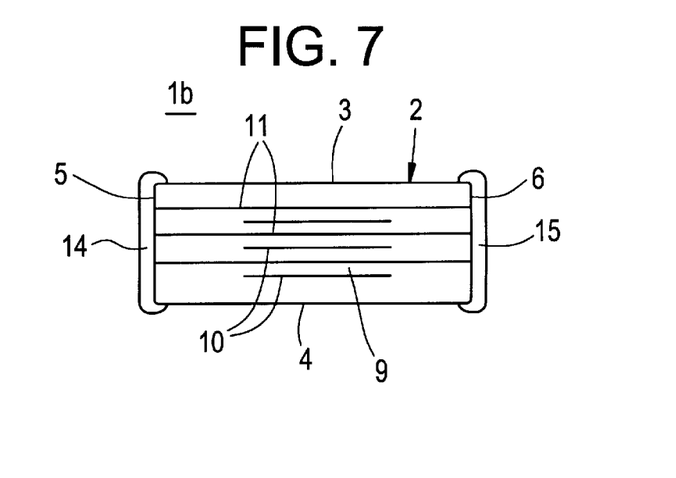
FIG. 7 is an elevated view of an interior structure of a multilayer capacitor according to another preferred embodiment of the present invention.

FIG. 7 is a cross-sectional view showing a multilayer capacitor 1b according to another preferred embodiment of the present invention.

The multilayer capacitor 1b has three pairs of first and second inner electrodes 10 and 11. The first and second inner electrodes 10 and 11 are arranged so as to oppose each other.

As shown in FIG. 7, in the multilayer capacitor 1b, there are provided a plurality of portions that oppose the first and second inner electrodes 10 and 11, a plurality of capacitor units are provided. The plurality of the capacitor units are parallel-connected via the terminal electrodes 14 and 15 shown in FIG. 7 and the terminal electrodes 12 and 13 (which are not shown in FIG. 7, but refer to FIG. 2). This structure allows even greater electrostatic capacitance to be achieved.

As described above, although the present invention has been described referring to preferred embodiments shown in figures, it is not restricted thereto. On the contrary, the present invention is intended to cover various other modifications and equivalent arrangements within the spirit and scope of the invention.

What is claimed is:

1. A multilayer capacitor comprising:
a capacitor body having a shape defined by a lengthwise dimension, a widthwise dimension, and a heightwise dimension, the capacitor body including first and second main surfaces that oppose each other and are individually defined by said lengthwise dimension and said widthwise dimension, first and second side surfaces that oppose each other and are individually defined by said lengthwise dimension and said heightwise dimension, and first and second end surfaces that oppose each other and are individually defined by said widthwise dimension and said heightwise dimension; wherein
said capacitor body includes:
a plurality of dielectric layers extending substantially parallel to said first and second main surfaces; and
at least one pair of first and second inner electrodes that oppose each other via said dielectric layers so as to define a capacitor unit;
said first inner electrode extends so as to connect said first and second end surfaces, and said second inner electrode extends so as to connect said first and second side surfaces;
first and second end surface terminal electrodes electrically connected to individual ends of said first inner electrode are provided on said first and second end surfaces, respectively;
first and second side surface terminal electrodes electrically connected to individual ends of said second inner electrode are provided on said first and second side surfaces, respectively; and
said widthwise dimension of said capacitor body is within a range of about 0.9 to about 1.1 times of said lengthwise dimension.

2. A multilayer capacitor according to claim 1, wherein individual widths of said first and second inner electrodes are substantially the same.

3. A multilayer capacitor according to claim 1, wherein said lengthwise dimension and said widthwise dimension of said capacitor body are within a range of about 1.5 mm to about 4.0 mm.

4. A multilayer capacitor according to claim 3, wherein widths of said first and second inner electrodes are within a range of about 0.9 mm to about 2.5 mm.

5. A multilayer capacitor according to claim 1, wherein, when a represents said lengthwise dimension and said widthwise dimension and b represents widths of the first inner electrodes and the second inner electrodes, a and b have a relationship of $0.45 \leq b/a \leq 0.90$.

6. A multilayer capacitor according to claim 5, wherein a and b have the relationship of $0.50 \leq b/a \leq 0.85$.

7. A multilayer capacitor according to claim 1, wherein said dielectric layers are made of a material having a relative dielectric constant that is less than about 50.

8. A multilayer capacitor according to claim 1, further comprising multiple pairs of said first and second inner electrodes.

9. A multilayer capacitor according to claim 1, wherein said first and second inner electrodes are positioned closer to one of said first and second main surfaces of said capacitor body.

10. A multilayer capacitor according to claim 1, wherein a first resonant frequency is at least 1 GHz, and a second resonant frequency is at least 1.5 times of said first resonant frequency.

11. A multilayer capacitor according to claim 1, wherein said widthwise dimension and said lengthwise dimension are substantially equal.

12. A multilayer capacitor according to claim 1, wherein the shape of the capacitor body is substantially square.

13. A multilayer capacitor according to claim 1, wherein each of the first and second end surfaces includes only one of the first and second end surface terminal electrodes thereon, and each of the first and second side surfaces includes only one of the first and second side surface terminal electrodes thereon.

14. A multilayer capacitor comprising:
a capacitor body having a substantially square shape with first and second main surfaces and four side surfaces and a plurality of dielectric layers extending substantially parallel to said first and second main surfaces, at least one pair of first and second inner electrodes that oppose each other via said dielectric layers so as to define a capacitor unit, said first inner electrode extends so as to connect first and second of said four side surfaces, and said second inner electrode extends so as to connect third and fourth of said four side surfaces, each of the four side surfaces having at least one terminal electrode disposed thereon and electrically connected to individual ends of at least one of the first and second inner electrodes, wherein at least two of the four side surfaces have a dimension that is about 0.9 to about 1.1 times of a dimension of the other two of the four side surfaces.

15. A multilayer capacitor according to claim 14, wherein each of the four side surfaces has only one of the terminal electrodes thereon.

16. A multilayer capacitor according to claim 14, wherein individual widths of said first and second inner electrodes are substantially the same.

17. A multilayer capacitor according to claim 14, wherein the dimension of each of said four side surfaces of said capacitor body are within a range of about 1.5 mm to about 4.0 mm.

18. A multilayer capacitor according to claim 17, wherein widths of said first and second inner electrodes are within a range of about 0.9 mm to about 2.5 mm.

19. A multilayer capacitor according to claim 14, wherein, when a represents the dimension of at least one of said four sides and b represents widths of the first inner electrodes and the second inner electrodes, a and b have a relationship of $0.45 \leq b/a \leq 0.90$.

20. A multilayer capacitor according to claim 19, wherein a and b have the relationship of $0.50 \leq b/a \leq 0.85$.

21. A multilayer capacitor according to claim 14, wherein said dielectric layers are made of a material having a relative dielectric constant that is less than about 50.

22. A multilayer capacitor according to claim 14, further comprising multiple pairs of said first and second inner electrodes.

23. A multilayer capacitor according to claim 14, wherein said first and second inner electrodes are positioned closer to one of said first and second main surfaces of said capacitor body.

24. A multilayer capacitor according to claim 14, wherein a first resonant frequency is at least 1 GHz, and a second resonant frequency is at least 1.5 times of said first resonant frequency.

25. An electronic device comprising:
a multilayer capacitor including:
a capacitor body having a shape defined by a lengthwise dimension, a widthwise dimension, and a heightwise dimension, the capacitor body including first and second main surfaces that oppose each other and are individually defined by said lengthwise dimension and said widthwise dimension, first and second side surfaces that oppose each other and are individually defined by said lengthwise dimension and said heightwise dimension, and first and second end surfaces that oppose each other and are individually defined by said widthwise dimension and said heightwise dimension; wherein
said capacitor body includes:
a plurality of dielectric layers extending substantially parallel to said first and second main surfaces; and
at least one pair of first and second inner electrodes that oppose each other via said dielectric layers so as to define a capacitor unit;
said first inner electrode extends so as to connect said first and second end surfaces, and said second inner electrode extends so as to connect said first and second side surfaces;
first and second end surface terminal electrodes electrically connected to individual ends of said first inner electrode are provided on said first and second end surfaces, respectively;
first and second side surface terminal electrodes electrically connected to individual ends of said second inner electrode are provided on said first and second side surfaces, respectively; and
said widthwise dimension of said capacitor body is within a range of about 0.9 to about 1.1 times of said lengthwise dimension; and
a wiring substrate positioned to oppose said first and second main surfaces and to allow said multilayer capacitor to be mounted.

26. An electronic device comprising:
a multilayer capacitor including:
a capacitor body having a shape defined by a lengthwise dimension, a widthwise dimension, and a heightwise dimension, the capacitor body including first and second main surfaces that oppose each other and are individually defined by said lengthwise dimension and said widthwise dimension, first and second side surfaces that oppose each other and are individually defined by said lengthwise dimension and said heightwise dimension, and first and second end surfaces that oppose each other and are individually defined by said widthwise dimension and said heightwise dimension; wherein
said capacitor body includes:
a plurality of dielectric layers extending substantially parallel to said first and second main surfaces; and
at least one pair of first and second inner electrodes that oppose each other via said dielectric layers so as to define a capacitor unit;
said first inner electrode extends so as to connect said first and second end surfaces, and said second inner electrode extends so as to connect said first and second side surfaces;
first and second end surface terminal electrodes electrically connected to individual ends of said first inner electrode are provided on said first and second end surfaces, respectively;
first and second side surface terminal electrodes electrically connected to individual ends of said second inner electrode are provided on said first and second side surfaces, respectively;

said widthwise dimension of said capacitor body is within a range of about 0.9 to about 1.1 times of said lengthwise dimension;

said first and second inner electrodes are positioned closer to one of said first and second main surfaces of said capacitor body; and a wiring substrate arranged to oppose one of said first and second main surfaces of said capacitor body, to which said first and second inner electrodes are provided closer, and so as to allow said multilayer capacitor to be mounted.

27. A radio-frequency circuit comprising:

at least one multilayer capacitor including:

a capacitor body having a shape defined by a lengthwise dimension, a widthwise dimension, and a heightwise dimension, the capacitor body including first and second main surfaces that oppose each other and are individually defined by said lengthwise dimension and said widthwise dimension, first and second side surfaces that oppose each other and are individually defined by said lengthwise dimension and said heightwise dimension, and first and second end surfaces that oppose each other and are individually defined by said widthwise dimension and said heightwise dimension; wherein said capacitor body includes:

a plurality of dielectric layers extending substantially parallel to said first and second main surfaces; and at least one pair of first and second inner electrodes that oppose each other via said dielectric layers so as to define a capacitor unit;

said first inner electrode extends so as to connect said first and second end surfaces, and said second inner electrode extends so as to connect said first and second side surfaces;

first and second end surface terminal electrodes electrically connected to individual ends of said first inner electrode are provided on said first and second end surfaces, respectively;

first and second side surface terminal electrodes electrically connected to individual ends of said second inner electrode are provided on said first and second side surfaces, respectively; and said widthwise dimension of said capacitor body is within a range of about 0.9 to about 1.1 times of said lengthwise dimension.

28. A radio-frequency circuit comprising:

at least one multilayer capacitor including:

a capacitor body having a shape defined by a lengthwise dimension, a widthwise dimension, and a heightwise dimension, the capacitor body including first and second main surfaces that oppose each other and are individually defined by said lengthwise dimension and said widthwise dimension, first and second side surfaces that oppose each other and are individually defined by said lengthwise dimension and said heightwise dimension, and first and second end surfaces that oppose each other and are individually defined by said widthwise dimension and said heightwise dimension; wherein said capacitor body includes:

a plurality of dielectric layers extending substantially parallel to said first and second main surfaces; and at least one pair of first and second inner electrodes that oppose each other via said dielectric layers so as to define a capacitor unit;

said first inner electrode extends so as to connect said first and second end surfaces, and said second inner electrode extends so as to connect said first and second side surfaces;

first and second end surface terminal electrodes electrically connected to individual ends of said first inner electrode are provided on said first and second end surfaces, respectively;

first and second side surface terminal electrodes electrically connected to individual ends of said second inner electrode are provided on said first and second side surfaces, respectively; and said widthwise dimension of said capacitor body is within a range of about 0.9 to about 1.1 times of said lengthwise dimension; wherein the at least one multilayer capacitor defines one of a decoupling capacitor, an impedance-matching capacitor, a dielectric-current cutting capacitor, and a low-pass/high-pass filtering capacitor.

* * * * *